UNITED STATES PATENT OFFICE.

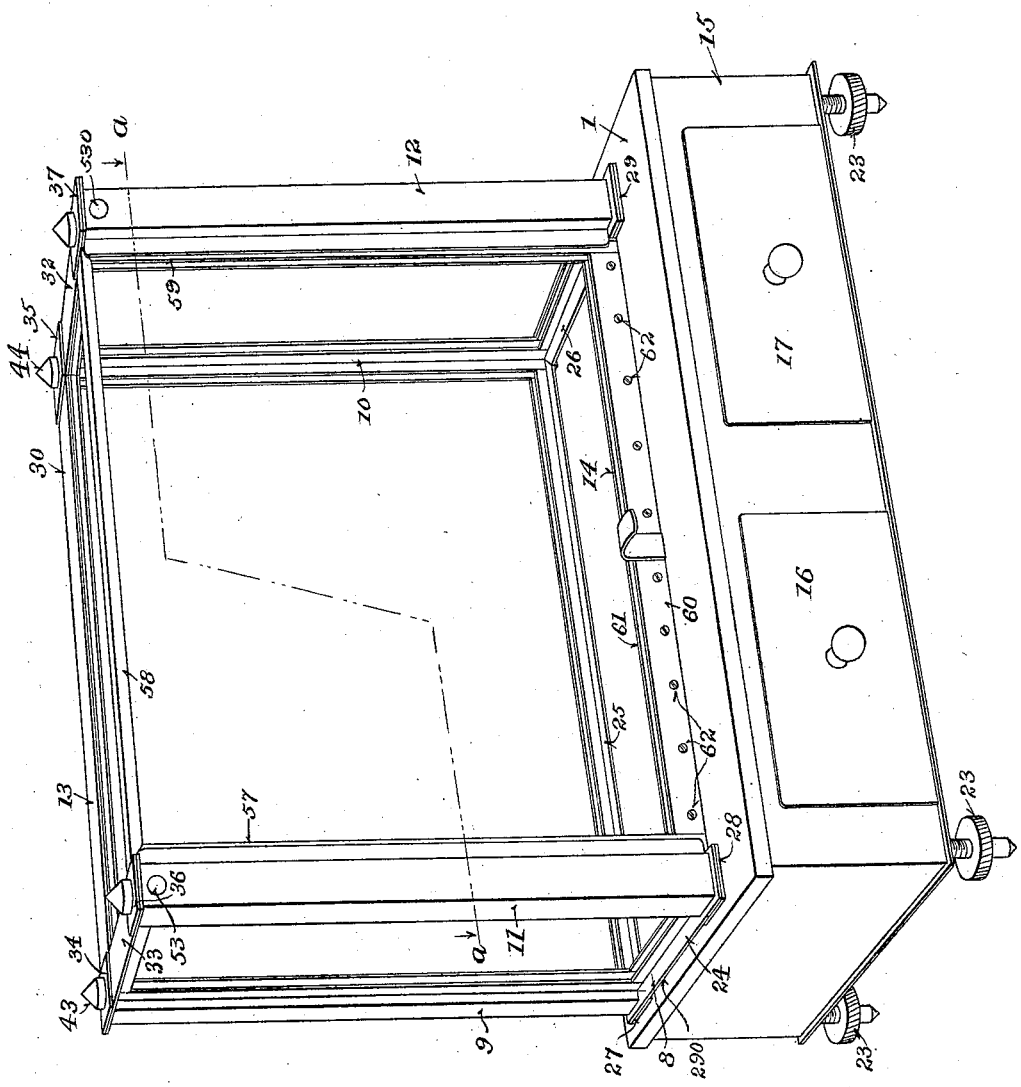

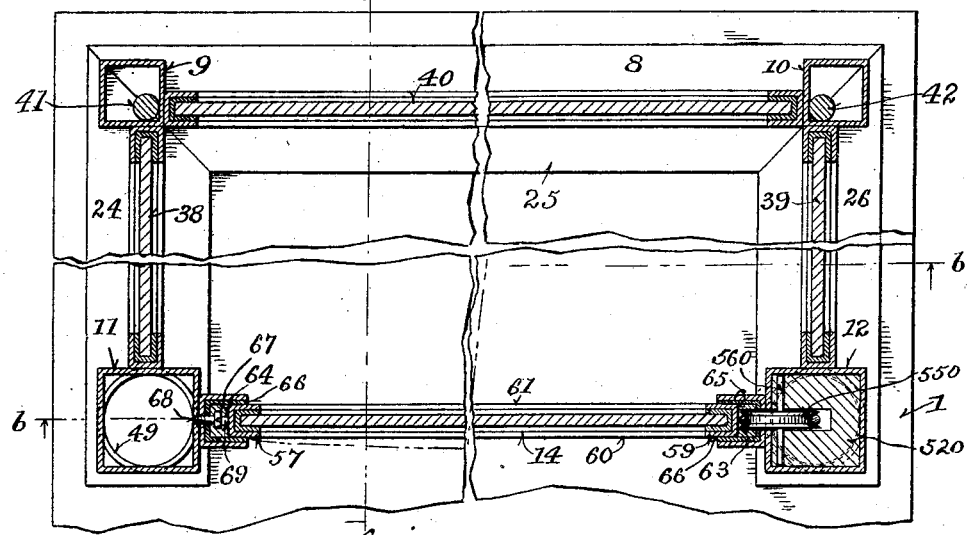
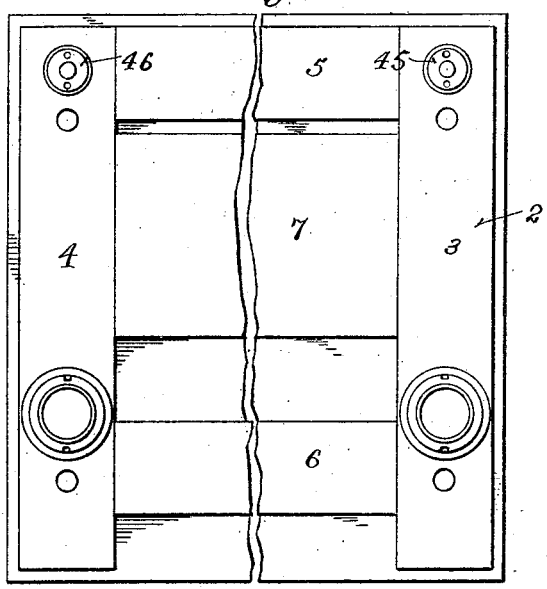
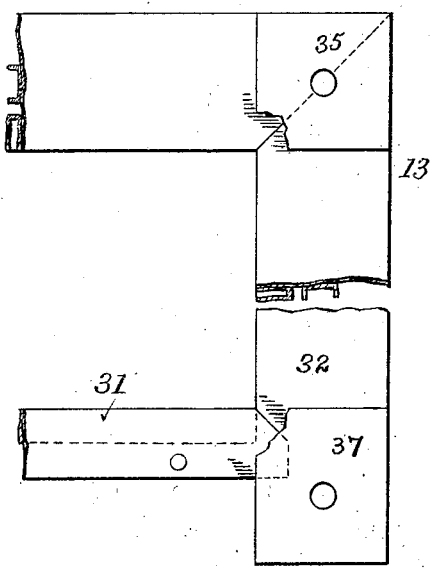

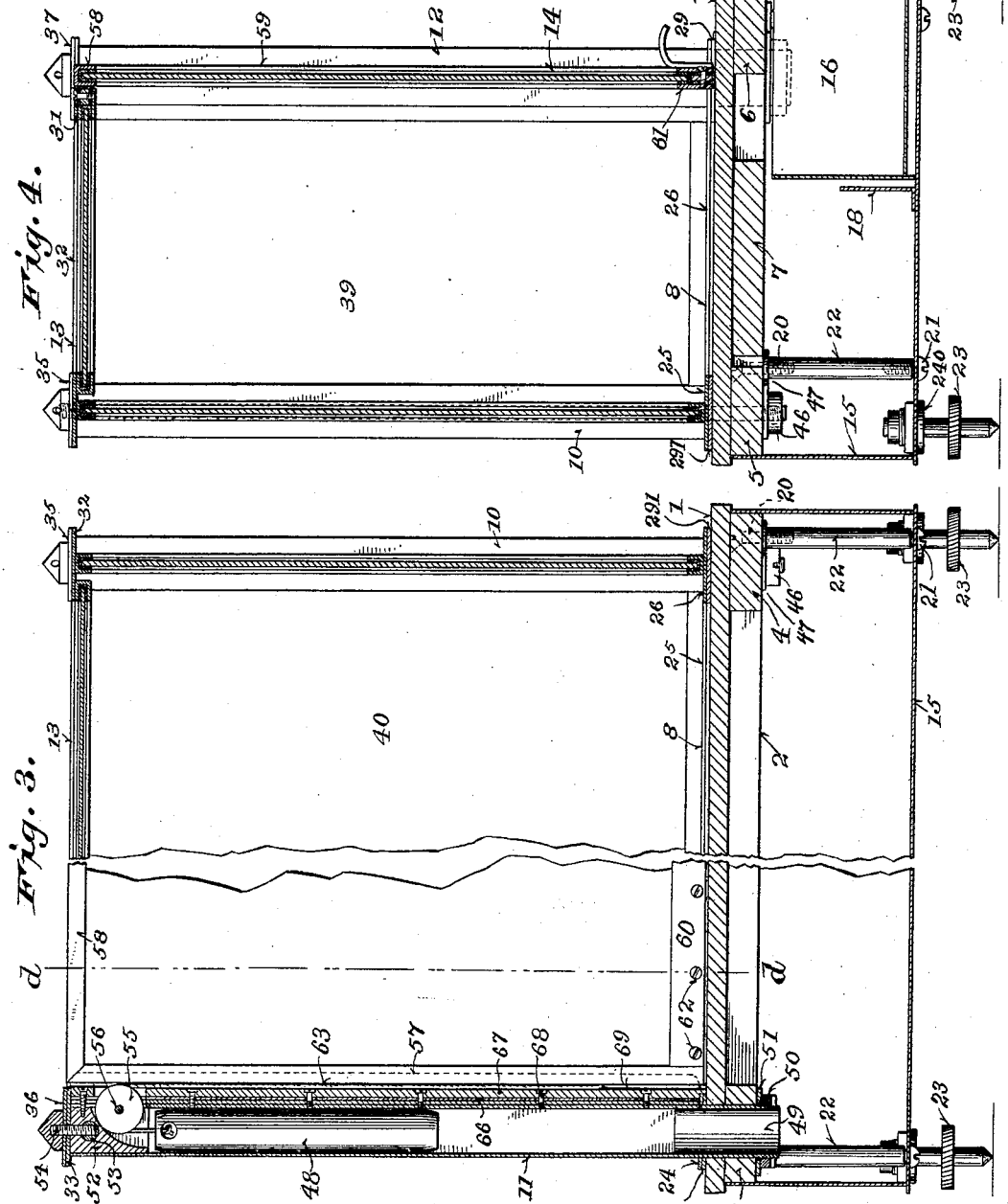

WILFRID HEUSSER AND ALFRED HEUSSER, OF SALT LAKE CITY, UTAH.

PROTECTING-CASING FOR BALANCES AND OTHER INSTRUMENTS.

934,526. Specification of Letters Patent. Patented Sept. 21, 1909.

Application filed October 26, 1908. Serial No. 459,498.

*To all whom it may concern:*

Be it known that we, WILFRID HEUSSER and ALFRED HEUSSER, citizens of the Republic of Switzerland, residing at Salt Lake City, in the county of Salt Lake and State of Utah, have invented certain new and useful Improvements in Protecting-Casings for Balances and other Instruments, of which the following is a specification, reference being had to the accompanying drawing, forming a part thereof.

This invention relates to protecting casings for balances and other instruments, and is designed to provide a casing which includes a metallic frame, which frame is strong, light and rigid, and which has its several parts so constructed and arranged that the glass back, ends and top and the door will be snugly held in place, and while permitting relative movement between the glasses and the frame resulting from changes of temperature, will maintain dust proof joints to prevent dust and dirt from entering the casing, as will be hereinafter specifically pointed out and claimed.

Referring to the drawings which accompany this specification and form a part thereof and on which the same reference characters are used to designate the same elements wherever they may appear in each of the several views, and which drawings illustrate an embodiment of this invention, Figure 1 illustrates in perspective a balance casing; Fig. 2 illustrates a horizontal section of the casing (parts of the casing being broken away) taken on the line *a—a* of Fig. 1; Fig. 3 illustrates a vertical longitudinal section taken on the line *b—b* of Fig. 2 (parts of the casing being broken away); Fig. 4 illustrates a vertical transverse section taken on the line *c—c* of Fig. 2; Fig. 5 is a plan view of the base of the casing viewed from below (parts of the casing being broken away); Fig. 6 is a plan view of sections of the top of the casing; and Fig. 7 is a detail cross section on the line *d—d* of Fig. 3 (part of the door being broken away).

Referring specifically to the drawings, the numeral 1 designates a base plate preferably formed from black glass, and beneath this base plate 1 is a base frame 2, composed of the wooden pieces 3, 4, 5, 6 and 7, properly secured together in any suitable or preferred manner.

On top of the base 1 is the bottom frame 8, upon which are the two back columns 9 and 10, and the two front columns 11 and 12. Upon the tops of these columns is the top frame 13, and slidably engaged with the front columns 11 and 12 is the door 14.

Surrounding the base frame 2 and resting against the under side of the base plate 1 is a sheet metal sub-base 15, which serves to inclose and protect the parts of the balance which may be located beneath the base plate 1 and base frame 2. This sub-base 15 may be provided with drawers 16 and 17, and is stiffened by the webs 18 and 19. This sub-base 15 is in reality only a metal box open at the top and secured to the base frame 2 by screws 20 and 21 and the spacing members 22. The sub-base is also provided with the leveling screws 23, which play in screw sockets 240 secured in the interior of said sub-base in any suitable or preferred manner.

The bottom frame 8 is composed of three flat strips of brass, 24, 25 and 26, which are mitered to form accurate joints, and are secured together by brazing, soldering or in any suitable or preferred manner, splicing plates 27 being provided on the under side of the frame and over said mitered joints, said splicing plates being secured to said frame by soldering or brazing, or in any suitable manner. Plates 28 and 29 of substantially the same thickness as the splicing plates 27 are also provided under the front ends of the two end members of the bottom frame, whereby a firm and tight contact can be maintained at the corners of the metal frame and the base, and whereby also are provided spaces 290 within which may be placed felt 291, or other packing substance, to make dust proof joints.

The top frame 13 is in all respects similar in construction to the bottom frame, except that to the rear of the door 14 a lengthwise strip 31 is located, which is spliced into the end strips 32 and 33 of the top frame in the manner clearly shown by Fig. 6 of the drawings, being brazed or soldered therein. The splicing plates 34, 35, 36 and 37 secured to the top frame in a manner similar to the splicing plates secured to the bottom frame, are however, placed on top of the top frame so as not to interfere with the structure of the metal frame designed for holding the glass top, back and ends to be presently described.

On the top of the end pieces 24, 26 and the back piece 25 of the bottom frame are secured channel shaped pieces of brass or other metal, with the cavity of the channel open upwardly and the width of the channel of sufficient size to receive and closely retain the glass with its strips of felt. These strips of felt besides providing dust proof joints, serve as cushions to prevent the glass being broken when the casing is jarred, and are compressed and expand as the glass and metal of the frame expand and contract under changes of temperature. The bottoms of the two end members 32 and 33 and the back member of the top frame are also provided with similar channel sections, the cavity of the channels opening downward and facing the cavities of the channels on the bottom frame. Each of the back columns 9 and 10 is provided with two sets of channel members, one for the back glass and the other for an end glass, and the two front columns 11 and 12 are also provided with two channel sections, one of each adapted to receive an end glass and the other of each to receive the door, which is slidable up and down therein. The end glasses 38 and 39, and the back glass 40 are slid into place in the channels while the top frame is removed.

The top frame is secured to the rear columns and the whole superstructure secured to the base frame 2 by means of bolts 41 and 42, which are secured within the rear columns and are provided with threaded ends upon which the nuts 43, 44, 45 and 46 are screwed. These bolts 41 and 42 may be secured within the rear columns by brazing or soldering, or may be secured thereto in any suitable or preferred manner, it being evident from an inspection of the drawings that by this arrangement the top frame can be securely clamped against the tops of said back columns and the bottom frame and base plate 1 can be securely clamped between the lower ends of said back columns and the base frame 2. Metallic washers 47 may be interposed between the nuts 45 and 46 and the wooden base frame.

The front columns 11 and 12 are preferably made somewhat larger than the back columns, in order to accommodate counterweights 48 for the door 14, and in order to reduce the height of said columns, a special connection through which a counterweight can pass into the sub-base, is provided for securing the front columns together with the bottom frame and the base 1, to the base frame 2. This construction is as follows: The front columns 11 and 12 are square in cross section, and at their lower ends they are lengthened by round metal tubes 49 of sufficient length to extend through the base 1 and base frame 2, and which are screw-threaded on the exterior to receive nuts 50 which bear against washers 51. The outside diameters of the tubes 49 are preferably the same as the outside dimensions of the front columns, and the tubes are cut away a short distance, so that their upper ends can be received within the front columns and securely secured thereto by brazing or soldering. This construction forms shoulders on the front columns, which shoulders are adapted to rest on the upper side of the bottom frame. The lower ends of the counterweights 48 are preferably tapered, as indicated, so that they will not catch upon the tops of tubes 49. The tubes 49 and nuts 50 thus serve to secure the front columns, the bottom frame and the base 1 to the base frame 2. In order to secure the top frame to the front column, blocks of wood 52 and 520 are snugly fitted into the tops of the front columns, and pins 53 and 530 are passed through the sides of the columns and said blocks, said pins being provided with a screwthreaded aperture into which screws (one of which is indicated by the numeral 54), are received, by which the top frame is securely clamped to the front columns.

Each front column is slitted on its door side for a short distance, and the blocks 52 and 520 are provided with recesses within which are located counterbalance wheels 55 and 550, these counterbalance wheels being firmly secured to shafts 56 and 560, which shafts are retained in apertures in the blocks 52 and 520. The blocks 52 and 520 are impregnated with paraffin, the effect being to lubricate the bearings for shafts 56 and 560, so that no other lubricant is ever necessary.

The door 14 is formed from three channel sections 57, 58 and 59, which are mitered and brazed or soldered together, and at its lower end the flat strip 60 is brazed to the channels 57 and 59, preferably on the front side of the glass. The door glass is surrounded at the edges with felt to serve a shock-absorber, a dust-proofing and a pa_ _g to permit of slight variations in the expansion and contraction of the glass and the metal, the same as the end, top and back glasses of the casing, and the glass with its felt is of somewhat less height than the metallic frame of the door, as clearly shown by Fig. 7 of the drawings, a strip of wood being inserted below the glass, which strip of wood is surrounded with felt in a manner similar to the glass, and on the rear side of the lower part of the door is a removable plate 61, secured to the flat strip 60 by screws 62. The counterweights 48 are secured to the door by the cords 63, and in order that the door may move easily and freely in the channels 64 and 65 provided for it, these channels are lined with paraffined or oiled paper 66, and strips of paraffined wood 67 are secured within the channels and the paper by screws 68, which strips of wood are provided with grooves 69 for the reception of the cords 63. This construction provides for lubricating the door and maintaining a dust proof joint and a joint which will wear for a very long time without giving any trouble.

The under side of the top frame 13 besides being provided with the three channels to receive the two end glasses and the back glass, is also provided with three channels secured to the under side thereof to receive the top glass, as is clearly shown by Fig. 6 of the drawings. The top glass is retained in place and a dust tight joint provided between the top frame and the door, in a manner similar to the construction of the lower part of the door already described, a strip of wood 70 surrounded by felt 71, being secured between the lengthwise strip 31 and a removable strip of metal 72, by the screws 73.

The casing is easily assembled or disassembled, if for example, it is desired to remove a broken glass, as either of the end glasses 38 or 39 or the back glass 40, the top frame is removed by removing the nuts 43 and 44 and the screws 54 and 540, when the top frame can be lifted off and either of said three glasses slid upwardly out of its channels. In order to remove the top glass, the metal strip 72 must be removed by removing the screws 73, and the top glass can then be slid out of its channels. To remove the door glass the screws 62 and plate 61 must be removed, when that glass can be slid out of its channels.

While the back and front columns are shown by the drawings and described in this specification as being square in cross section, it is to be understood that this invention is not limited to such square tubes, the square shape disclosed being adopted merely as a matter of convenience and for artistic effect. It should be also understood that the specific construction of the front columns, including the metal tubes 49, is the preferred construction for forming shoulders upon the square tubes, but by the term "shoulders" or "shoulder" used in the claims, is meant any similar or equivalent projection upon a column however formed.

While for a matter of convenience in assembling a balance within the casing illustrated and described, it is convenient to have a wooden base frame as a separate part from the base plate, it is to be understood that the term "base" as used in the claims is used to include both the specific construction shown and described, and any equivalent construction.

What is claimed is:

1. The combination in a casing, of a top frame provided on three sides thereof with channels adapted to receive the top glass, and on the fourth side thereof with a lengthwise strip, a glass having its edges surrounded with felt, inserted in the channels of said top frame, a piece of wood surrounded with felt bearing against said glass and resting against said lengthwise strip, and a removable strip of metal secured to said lengthwise strip to retain said glass and said wood within said top frame.

2. The combination in a casing, of a base, front and back columns and glasses secured thereto, each of said front columns being provided with a channel adapted to receive a door and each of said channels being lined with oiled paper and having a paraffined strip of wood retained therein.

3. The combination in a casing, of a base, a bottom frame, a top frame, front and back columns, and means for securing said columns and said top and bottom frames to said base, said bottom frames being provided with plates on the under sides thereof and located beneath said columns, whereby a firm contact may be maintained between said base and said frame below said columns, and whereby spaces are provided between said plates adapted to receive felt or similar packing material.

4. In a casing, the combination with the columns, base and glasses, of a door, three sides of which are formed of channels and the fourth side of which is formed by a flat strip, a glass received within said channels and bearing against said flat strip, a strip of wood bearing against said glass on one side and having a strip of felt secured to its opposite side, and a removable plate adapted to secure said wood strip to retain said glass in the channels of said door.

5. The combination in a casing, of a column, a paraffined wood block retained therein by a pin provided with a screwthreaded aperture, a counterweight wheel and axle rigidly secured together, said wooden block being provided with apertures adapted to receive said axle therein, a base, means for securing said column to said base, a top frame and a screw adapted to engage with the screwthreaded aperture of said pin to retain said top frame upon said column.

6. The combination in a casing, of a base, front and back columns, said front and back columns being provided each with a plurality of channels and said front columns being hollow, a bottom frame and a top frame, said bottom frame being provided with channels and said top frame being provided with a plurality of channels some of which are are adapted to coact with the channels of the bottom frame and channels of the front and back columns to retain the back and end glasses in the frame, the other channels of the top frame being adapted to retain the top glass in the frame, said back, end and top glasses, a door engaged within channels on said front columns, counterweights within said hollow front columns connected to said door, and means for securing said columns and said bottom and top frames to the base.

7. The combination with the base of a casing provided with an aperture, of a column which is square in cross section and which has secured thereto and projecting beyond its end a round tube adapted to pass through said aperture, said tube being of substantially the same diameter as the column whereby the corners of the column at its end form shoulders, and means for fastening the base upon said round tube and against said shoulders.

In witness whereof we hereto affix our signatures in presence of two witnesses.

WILFRID HEUSSER.
ALFRED HEUSSER.

Witnesses:
 E. M. REID,
 W. H. BARRETT.